US007464913B2

(12) United States Patent
Werner et al.

(10) Patent No.: US 7,464,913 B2
(45) Date of Patent: Dec. 16, 2008

(54) ORIFICE VALVE FOR BULK SOLIDS

(75) Inventors: Shawn Michael Werner, Salina, KS (US); Lee Edward Young, Salina, KS (US); Eric Jon Severson, Salina, KS (US)

(73) Assignee: Salina Vortex Corporation, Salina, KS (US)

( * ) Notice: Subject to any disclaimer, the term of this patent is extended or adjusted under 35 U.S.C. 154(b) by 41 days.

(21) Appl. No.: 11/350,501

(22) Filed: Feb. 9, 2006

(65) Prior Publication Data
US 2007/0181841 A1 Aug. 9, 2007

(51) Int. Cl.
F16K 3/00 (2006.01)
(52) U.S. Cl. .................. 251/329; 251/326; 277/491
(58) Field of Classification Search ............. 251/326, 251/327, 328, 329; 277/491, 492
See application file for complete search history.

(56) References Cited

U.S. PATENT DOCUMENTS

| 4,345,739 A * | 8/1982 | Wheatley ............. 251/358 |
| 4,541,453 A * | 9/1985 | Graf et al. ............ 137/315.31 |
| 5,255,893 A * | 10/1993 | Peterson ............. 251/328 |
| 5,449,146 A * | 9/1995 | Weagraff ............. 251/326 |
| 5,938,175 A * | 8/1999 | Young et al. .......... 251/329 |
| 6,227,234 B1 * | 5/2001 | Powers ............... 137/322 |
| 6,932,355 B1 * | 8/2005 | Hjertholm ............ 277/614 |

* cited by examiner

Primary Examiner—John K Fristoe, Jr.
(74) Attorney, Agent, or Firm—Stinson Morrison Hecker LLP

(57) ABSTRACT

An orifice valve having a moveable gate to control the flow of solids in a closed conveying system. The invention encompasses a valve housing with two complementary valve sections, each of a unitary construction. A single plate has a first planar surface, two opposed sidewalls and an end wall. The sidewalls include an integral flange section which presents planar surfaces that are placed in facing relationship with the planar flange surfaces of a second housing member so that the two form a closed cavity. A blade is received in the cavity and is reciprocal between open and closed positions so as to accommodate the flow of material or to block the flow. A novel guide seal member comprises spaced planar elements which are adapted to be sandwiched between the two opposed flanges of the housing sections, a second section which extends transversely to the planar section and presents a bearing surface across which the blade moves, a third section which extends transversely to the planar section at the opposite end thereof and overlaps the flanges, and a second guide seal member at the opposite end of said aligned housing sections and sandwiched between opposed flanges.

14 Claims, 4 Drawing Sheets

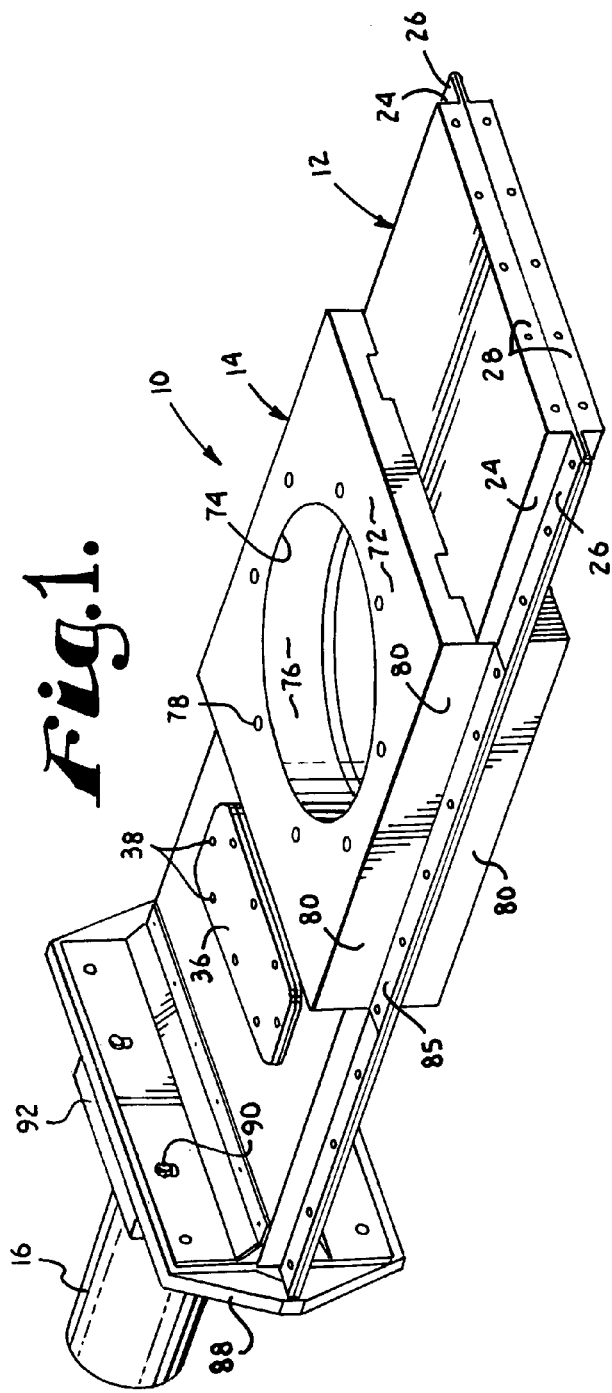

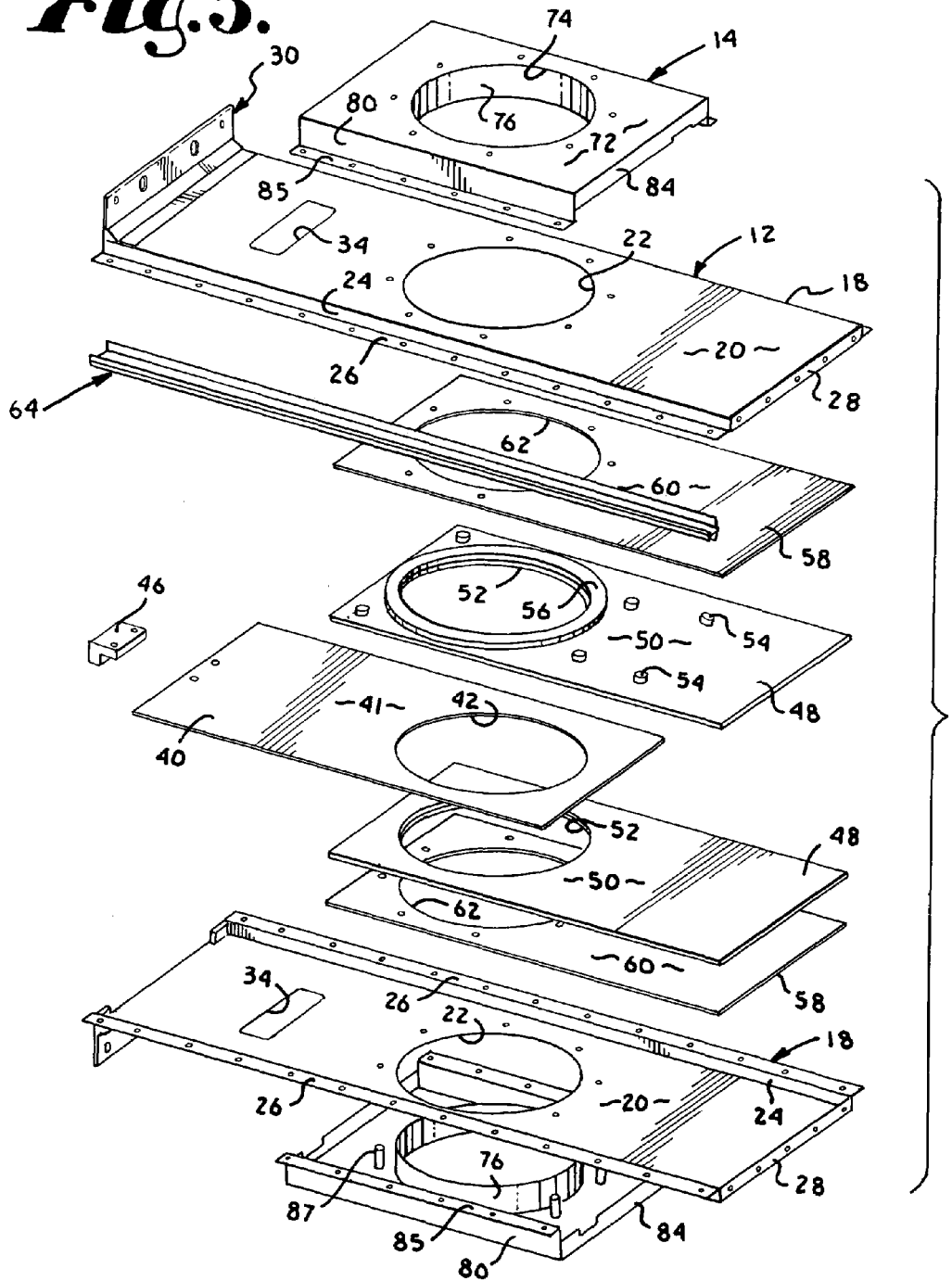

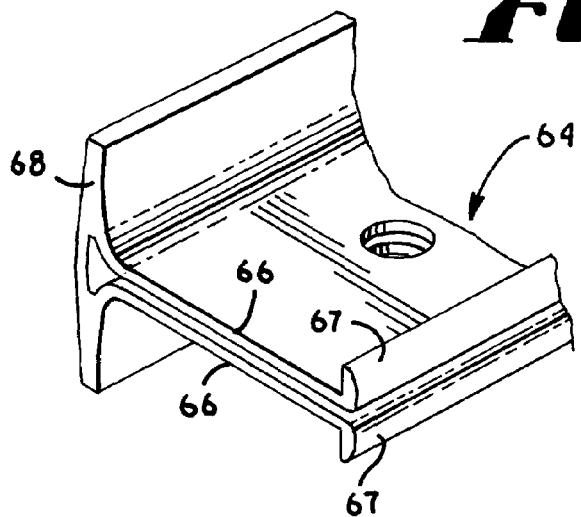
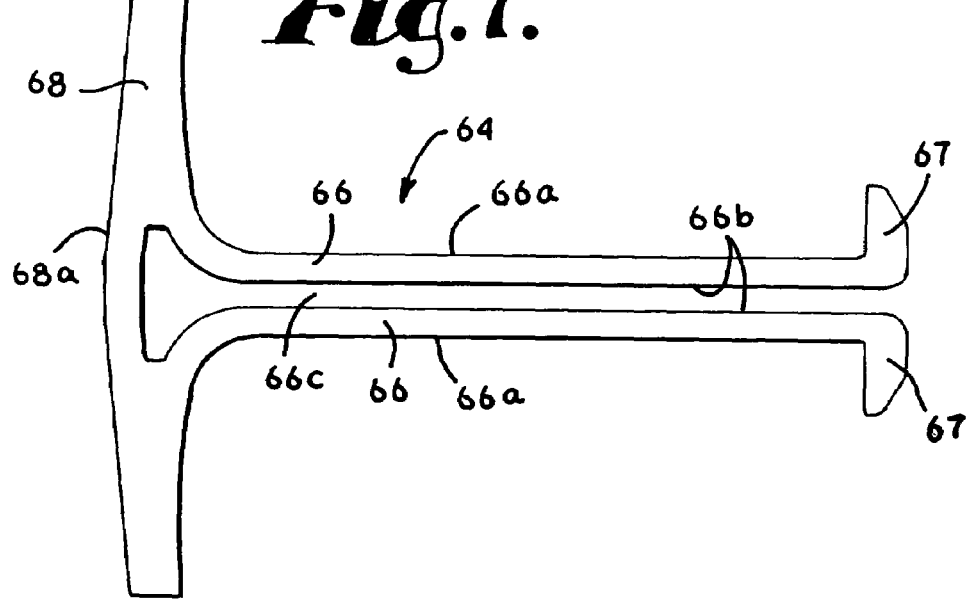

ORIFICE VALVE FOR BULK SOLIDS

This invention relates generally to material handling equipment and, more particularly, to an orifice valve for controlling the flow of bulk solids through a closed conveying system.

It is known in the material handling art to employ a reciprocal blade for controlling material flow such as in a gate valve or a diverter valve. An example of this type of valve is shown and described in prior art patent no. 4,221,307. As exemplified by the valve disclosed in the referenced patent, reciprocating blade type valves are characterized by two housing sections which form a cavity that encloses the reciprocating blade. The blade has one or more openings which align with one or more openings in the associated conduits to control the flow of material being conveyed. The blade is positioned by a linear actuator such as an electric or air cylinder. It may also be manually operated.

The prior art constructions require a large number of pieces which are necessary to form the valve housing and provide the required strength for industrial use. Typical prior art constructions have involved use of 25 to 30 components to form the valve housing with each component being separately fabricated then assembled together. A typical assembly has involved welding and sealing the various components into an integral unit designed to handle material under pressure. Prior constructions have utilized both carbon steel and aluminum but rarely stainless steel because of its cost.

SUMMARY OF THE INVENTION

The present invention represents an advancement in the art of orifice valves by providing a valve which is constructed of significantly fewer pieces than has heretofore been possible. This reduction in the number of pieces required to construct the valve is accomplished by utilizing a single piece of metal to form one half of the valve housing and an identical piece to form the other half of the valve housing. The continuous structure presented by the unitary housing sections eliminate multiple surfaces which require sealing. Strategic bending of the housing sections is utilized to impart the required strength. By utilizing this construction the number of pieces is reduced, which accordingly reduces fabrication costs including the labor necessary for assembly. The reduction in the number of pieces utilized to form the valve housing also means that there are fewer pieces which have to be sealed which in turn reduces the risk of seal failure and the resulting material leakage into the environment. By utilizing the construction according to the present invention, the number and thickness of reinforcing pieces can be reduced which reduces the overall weight of the valve resulting in lower shipping, handling and installation costs. This weight savings is significant enough that a valve constructed according to the teachings of the present invention can be made from thin gauge steel with the end weight being no greater than that of a comparable size valve made of aluminum.

The present invention also contemplates a novel guide seal for a valve employing a reciprocating blade which eliminates the need for the blade to be notched to receive a guide as is the case with prior art constructions. Instead, an integral seal guide constructed with a split shim and a bearing surface is provided which is placed between the two sections of the valve housing and has a transverse portion which presents a bearing surface over which the blade moves. On the opposite end from the bearing surface is another transverse section which overlies the edges of the two housing sections to present a complete seal between the two sections. The split shim section of the guide seal receives the shim stock to properly space the housing sections and control the seal loads on the blade.

The invention also contemplates a novel mounting flange which replaces the thick heavy flanges of the prior art with a planar member which is formed with integral sides and mounting flanges that are formed by a unitary piece of metal bent to the desired shape. The bends provide strength to the flange which results in a construction with strength comparable to that of flanges of the prior art but much lighter in weight and less expensive to manufacture.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 1 is a perspective view of an orifice valve according to the present invention;

FIG. 2 is a longitudinal vertical cross-sectional view taken through the center of FIG. 1;

FIG. 5 is an exploded view of the valve body showing the various components;

FIG. 6 is a perspective view of the seal guide; and

FIG. 7 is an enlarged vertical end view of the seal guide.

DETAILED DESCRIPTION OF PREFERRED EMBODIMENT

Figure 3:
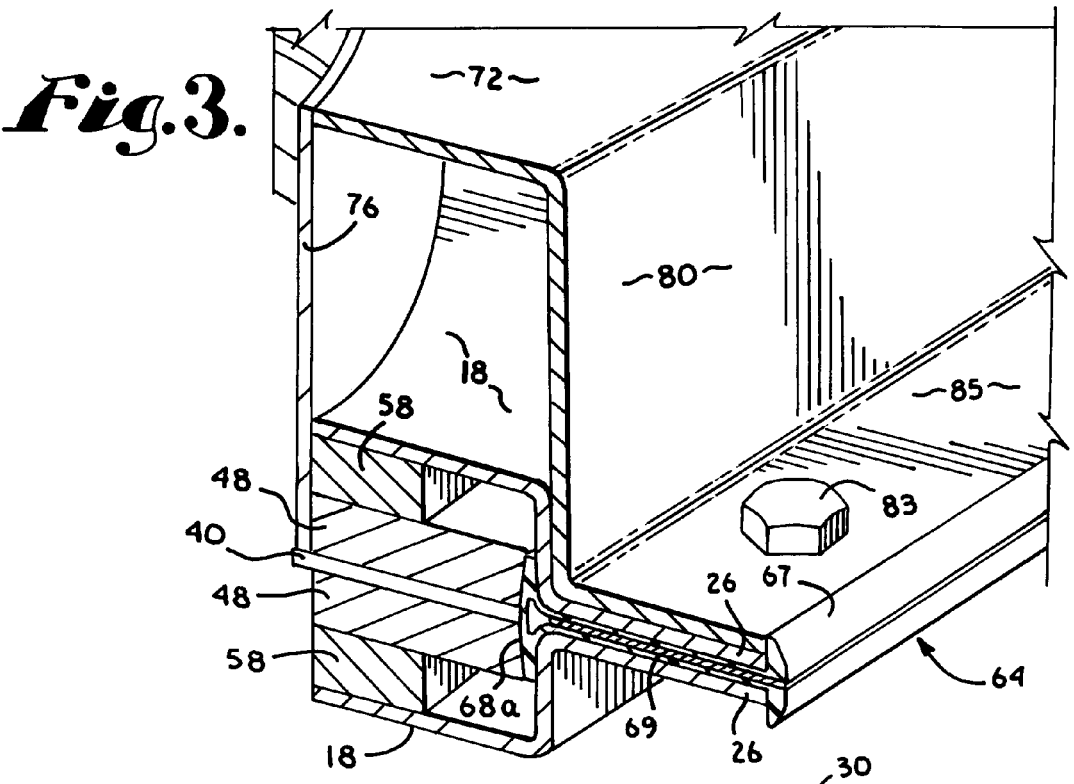
FIG. 3 is a fragmentary vertical cross-sectional view taken at 90° relative to the section of FIG. 2.

Referring initially to FIG. 1, the orifice valve according to the present invention is designated generally by the numeral 10 and includes housing 12, flange mounts 14 and cylinder 16.

Referring additionally to FIGS. 2 and 5, housing 12 is comprised of two opposed substantially identical housing sections 18, each of which is a unitary body having a first planar surface 20, a central opening 22, integral opposed sidewalls 24 perpendicular to the first planar surface, and flanges 26 which are integral with, and extend outwardly from, sidewalls 24 to present second planar surfaces which are parallel to first planar surface 20. Flanges 26 mate with the flanges of an adjacent section when the two sections are placed in facing relationship. Each housing section 12 also includes an integral first end wall 28 and a second end wall 30. First end wall 28 is formed by bending the plate stock which forms planar surface 20 at a 90° angle relative to this surface. Second end wall 30 is formed from the same plate stock as the rest of the housing section 18 and is at the opposite end of the housing from first end wall 28.

Figure 4:
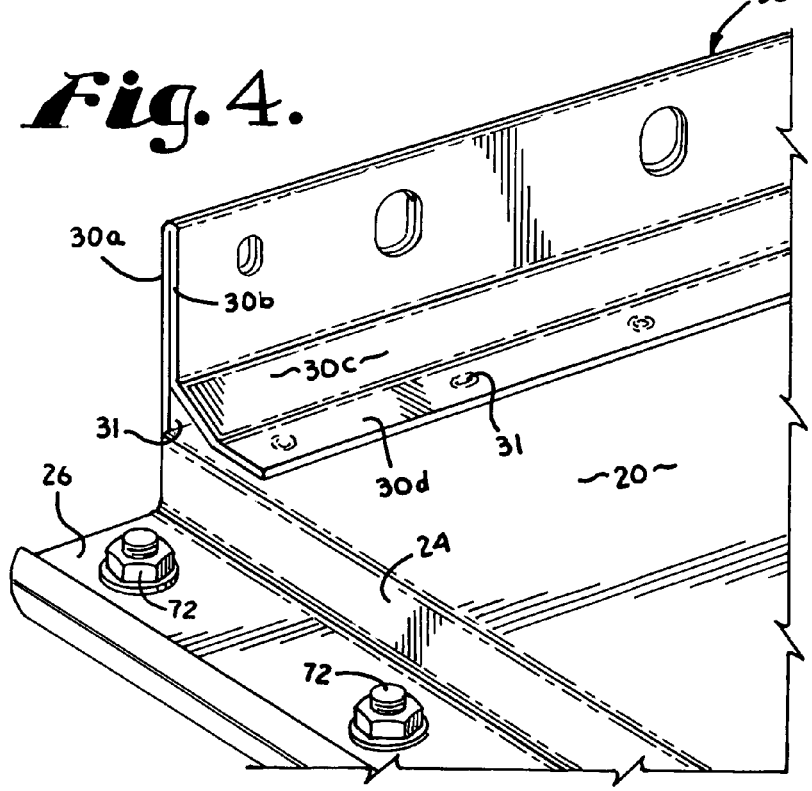
FIG. 4 is an enlarged perspective end view of the valve housing showing the integral end flange.

Referring to FIG. 4, second end wall 30 is formed by bending the plate stock in a first direction perpendicular to planar surface 20 to form end wall section 30*a* and then bending the end wall 180° to form a second end wall section 30*b* which extends in a second direction back toward planar surface 20 while being parallel to and contiguous with section 30*a*. The end wall is then bent at an obtuse angle to form a third wall section 30*c* which extends in a third direction toward planar surface 20 and bent again to form a final wall section 30d extending in a fourth direction. Section 30d is formed by bending the end wall at a second obtuse angle to present planar section 30d which is parallel to and contiguous with planar surface 20. In addition to central opening 22, each housing section 18 includes a maintenance access opening 34. Each access opening 34 is closed by aligned cover plates 36 (FIG. 1). These plates are secured to the housing section by fasteners 38. Spot welds 31 are placed along wall section 30d to securely attach the wall to housing section 18 and a tack weld 31 is also placed at each end of wall 30 where it is bent upwardly from planar surface 20.

Referring to FIGS. 2 and 5, a moveable blade 40 fits within the closed cavity presented by the two aligned and facing housing sections 18. Blade 40 is of generally rectangular configuration and includes a solid portion 41 and an opening 42. Opening 42 is of the same diameter as openings 32 in housing sections 18. Blade 40 is coupled with cylinder 16 through a cylinder rod 44 which is rigid with a clevis 46 that is secured to the blade.

Positioned between blade 40 and each housing section 18 is a pressure plate 48 which is generally rectangular and includes a solid portion 50 and an opening 52. A plurality of compressible buttons 54 are mounted on solid portion 50 in spaced apart relationship. It is to be noted that these buttons are positioned around the entire perimeter of opening 52. Also mounted on the solid portion of pressure plate 48 is a compressible orifice ring 56 having an internal diameter which corresponds with the diameter of opening 52. Positioned on the side of pressure plate 48 opposite blade 40 and between the plate and housing section 18 is a generally rectangular shim 58 of the same dimensions and configuration as the pressure plate. Thus, shim 58 has a solid portion 60 and a central opening 62 corresponding to the solid positions and openings of the pressure plate and blade.

Referring to FIG. 3 a guide seal member 64 is positioned on either side of blade 40 and extends the length of housing section 18. The guide seal member 64 is sandwiched between flanges 26 of the two housing sections 18. Guide seal member 64 is shown in greater detail in FIGS. 6 and 7. First and second spaced planar surface presenting elements 66 are of a length generally corresponding to the width of flanges 26. Each element presents a first planar surface 66a which engages a flange 26 on one housing element and an inner planar surface 66b which defines the gap with the corresponding spaced element 66. The second element 66 also includes planar surface 66a which engages the flange 26 of the second housing section. Integral with elements 66 are seal surface presenting elements 67, each of which extends from a corresponding element 66 at a generally right angle so as to overlap the edge of the corresponding housing flange 26. Member 64 also includes a T-section 68 which is integral with elements 66 and presents a blade bearing surface 68a which is transverse to planar surfaces 66a. It is to be noted that the transverse dimension of T-section 68 is slightly greater at the area of contact between the surface and the blade. The gap between planar surfaces 66b presents a cavity 66c for receiving one or more pieces of shim stock to insure proper spacing between housing sections 18. A plurality of retainers in the form of nut and bolt assemblies 72 pass through the flanges 26 of aligned housing sections 18 as well as guide seal 64 and the associated shim stock 69 to hold these components in rigid relationship.

Details of flange mount 14 are shown in FIGS. 1, 3 and 5. The flange mount 14 includes a first planar section 72 having an opening 74 and an inwardly projecting circumferential collar 76. Collar 76 extends downwardly a distance equal to the thickness of the flange and the thickness of housing 18 to a point just above blade 40. A plurality of openings 78 in planar section 72 provide means for attaching a conduit flange to the member 14. Member 14 also includes opposed side walls 80 which are integral with planar section 72 and extend perpendicular to same on opposite sides of housing section 18. A plurality of fasteners 83 (FIG. 3) in the form of nut and bolt assemblies secure flange mount 14 to housing sections 18. These may be the same nut and bolt assemblies that are used to partially secure the two housing sections together. As can be seen from viewing FIG. 3, side walls 80 extend downwardly parallel to side walls 24 of section 18. A second planar section 85 of flange mount 14 is integral with each side wall 80 and extends outwardly at a 90° angle in parallel to the first planar section 72 so as to overlay flange 26. Flange mount 14 also includes integral end walls 84 which extend downwardly from planar section 72 and are perpendicular to the latter. End walls 84 terminate in contact with the planar surface 20 of housing section 18. Barrel nuts 87 are secured to the underside of planar section 72 and provide means for securing the flange bolts (not shown) from a conduit coupler flange. These barrel nuts also serve as an important structural component by creating an enlarged section modulus between the flange and the corresponding housing section. Referring again to FIGS. 1 and 2, a cover plate 88 is secured to end wall 30 by nut and bolt assemblies 90 which also pass through a cylinder mounting plate 92 which secures cylinder 16.

In operation, valve 10 is installed in a bulk solids conveying system to control the flow of material. Conduits are secured to flange mounts 14 and gate 40 is moveable by way of cylinder 16 between flow blocking positions wherein solid portion 41 of the blade blocks the aligned openings 22 and 74 in housing section 18 and flange mount 14, and the fully open position shown in FIG. 2 wherein the openings 22 and 74 are aligned with blade opening 42 to create a through passage for the valve. Guide seal members 64 in the form of split shims are made of nylon or other low friction material which not only facilitates the seal between the two housing sections, but also provides for a low friction guide surface engageable by the edges of the blade. The members 64 eliminate the need for notching the sides of the blade to hold a guide piece. It will be appreciated that different numbers of shim stock pieces 69 may be utilized as well as different thicknesses to achieve the desired spacing between housing sections 18. Member 64 is designed to accommodate varying shim thicknesses while minimizing distortion of the member and the performance of its sealing function. The thickness of the shim seal member 64 with the shim 69 in place controls the seal load on blade 40. Compressible buttons 54 maintain a uniform load on plate 48 which in turn bears against blade 40 as it travels through its full reciprocating stroke. Although not shown, it is to be understood that if it is desired to seal the ends 28 of opposed sections 18, a seal and end plate can be secured to end walls 28. Cover plates 36 are removable to access the interior cavity of the valve for maintenance purposes.

While the invention has been disclosed with flange mounts 14, it is to be understood that a conventional flange plate which is of approximately the thickness as end walls 84 and is made of solid material could be utilized. This construction may be desirable for certain applications where an airtight seal between the mounting flange and the valve is desired. Housing sections 18 may be formed with reinforcing indentations if it is desired to provide additional strength for planar surfaces 20.

It is also to be understood that while the invention has been disclosed with reference to blocking a single opening, the principles of the invention are equally applicable to valves having multiple openings, for example where material is to be diverted periodically from one conduit to another. In this application the valve would be constructed to block one of two or more side by side openings while other openings are free to pass material.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An orifice valve for controlling the flow of bulk solids through an opening, said valve comprising:
    a housing comprised of two opposed sections each of which is a unitary body formed from a single piece of plate stock and presenting a first planar surface having an opening, two integral opposed sidewalls and an integral end wall, said walls each being perpendicular to said first planar surface and cooperating when said sections are placed in facing relationship to present a closed cavity, each of said sections further including a flange extending outwardly from each of said sidewalls and presenting a second planar surface parallel to said first planar surface, said flanges mating with one another when said sections are placed in facing relationship;
    a second end wall which extends in a first direction perpendicular to said first planar surface, and is bent 180° to extend in a second direction parallel and opposite to the first direction, and is bent again at an obtuse angle to extend in a third direction toward said first planar surface, and is bent again at an obtuse angle to extend in a fourth direction parallel to and in contact with said first planar surface;
    a seal sandwiched between said second planar surfaces;
    a blade received in said cavity and reciprocal between open and closed positions, said blade having an opening which aligns with said openings in said housing in the open position and having a solid section which blocks said housing openings in the closed position; and
    a plurality of retainers which hold said sections in rigid facing relationship.

2. The invention of claim 1, said seal presenting a bearing surface for said blade on the inside of said closed cavity.

3. The invention of claim 2, said seal presenting a cap which covers the exposed edges of said flanges.

4. The invention of claim 3, said seal comprising first and second spaced elements presenting surfaces for engagement with said first planar surfaces and a shim between said spaced elements.

5. The invention of claim 1, including first and second flange mounts for coupling said housing with bulk solids conduits on opposite sides of said housing, each of said mounts being coupled with one of said housing sections and comprising a first planar section having an opening aligned with the opening of the adjacent housing section, opposed side walls which are integral with said planar section and extend perpendicular to same on opposite sides of said adjacent housing section and a second planar section integral with said side walls and extending parallel to said first planar section on opposite sides of the latter, said second planar section overlying said second planar surfaces of the adjacent housing section, and a plurality of retainers which hold said mounts to said housing sections.

6. The invention of claim 5, said retainers comprising a plurality of barrel nuts positioned between said flange mounts and said housing sections, each of said barrel nuts being rigid with said housing section, said retainers further comprising a plurality of bolts passing through said flange mounts and received by said barrel nuts.

7. The invention of claim 5, each of said mounts including integral opposed end walls which are perpendicular to the planar surface of the mount and engage the first planar surface of an adjacent housing section.

8. The invention of claim 7, said retainers holding said mount to said housing sections and also holding said sections in facing relationship.

9. In an orifice valve comprised of two opposed housing sections with facing opposed flanges having exposed edges, each section having an opening, and further comprising a blade sandwiched between said sections and having an opening which, when aligned with the two housing openings, presents a thru passage, said blade having a solid passage blocking portion and being moveable between the thru passage presenting position and the passage blocking position the improvement comprising:
    first and second guide seal members each comprising a first planar section adapted to be sandwiched between said opposed flanges on one side of said housing, a second section which extends transversely to said planar section at one end of the latter and presents a bearing surface on one side of said housing across which said blade slides, and a third section which extends transversely to said planar section at the opposite end thereof and overlaps the edges of said flanges on one side of said housing.

10. The invention of claim 9, the cross sectional dimension of said second section being greatest at the intersection of said first and second sections.

11. The invention of claim 9, said third section having a curvilinear outer surface.

12. A seal for use in a valve for controlling the flow of bulk solids through an opening, the valve comprising two opposed having sections with flat mating surfaces which form a closed cavity and a blade which is received in said cavity and is reciprocal between open and closed positions, said seal comprising:
    first and second spaced planar surfaces presenting elements adapted to engage said flat mating surfaces;
    first and second vertical seal surfaces presenting elements each of which is integral with one of said planar surfaces and extends from the latter at a generally right angle so as to overlap one of said housing section at the area of said mating surface; and
    a T-section integral with said first and second planar surfaces presenting element and presenting a blade guide surface transverse to said first and second planar surfaces,
    whereby at least one shim may be received between said planar surfaces to properly space said two opposed housing sections apart.

13. The invention of claim 12, said seal comprising first and second spaced elements presenting surfaces for engagement with said first planar surfaces and a shim between said spaced elements.

14. An orifice valve for controlling the flow of bulk solids through an opening, said valve comprising:
- a housing comprised of two opposed sections each of which is a unitary body formed from a single piece of plate stock and presenting a first planar surface having an opening, two integral opposed sidewalls and an integral end wall, said walls each being perpendicular to said first planar surface and cooperating when said sections are placed in facing relationship to present a closed cavity, each of said sections further including a flange extending outwardly from each of said sidewalls and presenting a second planar surface parallel to said first planar surface, said flanges mating with one another when said sections are placed in facing relationship;
- a first pressure plate between said blade and a first housing section;
- a first shim between said first pressure plate and said first housing section;
- a second pressure plate between said blade and said second housing section;
- a second shim between said second pressure plate and said second housing section;
    - a plurality of compressible buttons positioned between said shims and between said pressure plates and said housing;
    - a blade received in said cavity and reciprocal between open and closed positions, said blade having an opening which aligns with said openings in said housing in the open position and having a solid section which blocks said housing openings in the closed position; and
- a plurality of retainers which hold said sections in rigid facing relationship.

* * * * *